(12) United States Patent
Skoff et al.

(10) Patent No.: US 6,943,673 B2
(45) Date of Patent: Sep. 13, 2005

(54) DEVICE FOR THE AUTOMATIC ACTUATION OF A TIRE-FILLING APPARATUS FOR A MOTOR VEHICLE

(75) Inventors: Gerhard Skoff, Vienna (AT); Heinz Christely, Neubau (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 64 days.

(21) Appl. No.: 10/437,269

(22) Filed: May 13, 2003

(65) Prior Publication Data

US 2003/0230342 A1 Dec. 18, 2003

(30) Foreign Application Priority Data

May 14, 2002 (AT) ........................................ A 734/2002

(51) Int. Cl.[7] .............................................. B60C 23/00
(52) U.S. Cl. ........................ 340/442; 152/415; 73/146; 73/146.8; 137/224
(58) Field of Search ................................ 340/442–444, 340/678; 152/415, 416; 137/224; 73/146, 146.2, 146.3, 146.8

(56) References Cited

U.S. PATENT DOCUMENTS

| 4,582,108 A | * | 4/1986 | Markow et al. | 152/418 |
| 4,640,331 A | * | 2/1987 | Braun et al. | 152/417 |
| 5,587,698 A | * | 12/1996 | Genna | 340/442 |
| 5,647,927 A | * | 7/1997 | Mason | 152/415 |
| 5,865,917 A | * | 2/1999 | Loewe | 152/426 |
| 6,144,295 A | * | 11/2000 | Adams et al. | 340/442 |

FOREIGN PATENT DOCUMENTS

| AT | 408 867 | 8/2001 |
| DE | 005 548 | 8/2001 |

* cited by examiner

*Primary Examiner*—Jeffery Hofsass
*Assistant Examiner*—Eric Blount
(74) *Attorney, Agent, or Firm*—Herbert Dubno

(57) ABSTRACT

An automatic tire-filling apparatus for a motor vehicle has an electronic controller which, in response to sensors for the operating state of the vehicle, controls pneumatic valves for the tires and a compressor to enable the tire pressure to be matched to such conditions as travel speed, vehicle load, roadway conditions and terrain. The compressor is in a normal operating state part of a closed system with the tire and the pressure reservoir and is directly connected to the pressure reservoir without the intermediary of a switching element.

9 Claims, 1 Drawing Sheet

DEVICE FOR THE AUTOMATIC ACTUATION OF A TIRE-FILLING APPARATUS FOR A MOTOR VEHICLE

FIELD OF THE INVENTION

Our present invention relates to the operation of a tire-filling apparatus and, more particularly, to a method of and a device for the control of the automatic filling of tires of a motor vehicle.

BACKGROUND OF THE INVENTION

An apparatus for the control of motor vehicle tire pressure can comprise a compressor which can be connected to the tires by respective valves and provided with an electronic controller which, via sensors, detects the tire pressures and the operating state of the vehicle and regulates pneumatic valves between the compressor and the tire for relating the tire pressures based upon such conditions as the vehicle speed, the vehicle load, the road conditions, the terrain and the like.

Austrian patent 408,867, for example, discloses such a device for the automatic actuation of a tire-filling system for a motor vehicle in which a compressor is connected to the tires and the pressure reservoir.

The principal parameter which controls the tire pressure is the vehicle speed and the actual tire pressure can be measured and a setpoint for the tire pressure can be calculated from the vehicle speed and the deviation of the actual tire pressure from the setpoint can be corrected by admitting fluid to or reducing fluid from the tire via a respective valve until the setpoint of the tire pressure is reached for each tire provided with such control.

The air required for filling the tires or raising the tire pressure is usually drawn by the compressor from the ambient atmosphere and compressed and the release of air for reduction of the tire pressure is also to the surrounding atmosphere.

The critical operation of an automatic tire-pressure controller is the filling of the tires with air to the proper pressure, since, at any vehicle speed, operation of the tire below the optimum pressure creates a safety problem. For systems utilizing a storage reservoir for the fluid under pressure, automatic operation in this manner can frequently result in rapid depletion because of multiple control operations and thus place the system in a state where it is unable to reliably control the pressure of the tires as a function of the vehicle speed, for example.

To avoid such critical conditions, the compressor can be connected in a system between the tires and the pressure reservoir which is normally closed, i.e. neither draws fluid from nor discharges fluid into the atmosphere. In that case, the pressure reservoir may be a reserve wheel and the compressor is connected to that pressure reservoir by a 3-port 2-position (3/2) magnetic valve. This magnetic valve however must be controlled generally independently of the remainder of the system and the valve tends to increase the gas of the system and the need for operating this valve increases its complexity.

OBJECTS OF THE INVENTION

It is, therefore, the principal object of the present invention to provide an automatic tire-filling apparatus which is free from the aforementioned drawbacks and thus which is simplified by comparison with earlier systems.

More particularly, it is an object of the invention to provide a device for the automatic actuation of a tire-filling apparatus for a motor vehicle whereby the cost and complexity of a separate control of the type described can be eliminated.

It is also an object of the invention to provide an improved automatic tire-filling apparatus for a motor vehicle which is simple to operate and is more reliable than earlier systems.

It is also an object of this invention to provide an improved method of operating an automatic tire-filling system.

SUMMARY OF THE INVENTION

These objects and others which will become more readily apparent hereinafter are achieved, in accordance with the invention, by connecting the compressor directly with the pressure reservoir in a system of the type described at the outset, i.e. without the intermediary of any valve between the compressor and the compressor reservoir that is in communication with both of them.

The reference to a direct connection between the compressor and the pressure reservoir is intended, therefore, to exclude a connection which takes place through a valve whether it be the 3/2 valve previously mentioned or any other valve.

An automatic tire-filling apparatus for a motor vehicle can thus comprise:

a pressure reservoir for a tire-filling fluid;

a compressor directly connected to the pressure reservoir without the intermediary of a valve;

a multiplicity of valves connected to the compressor and arranged to control pressure in tires of the vehicle, the compressor, the pressure reservoir and the tires forming a closed system isolated from the atmosphere in a normal operating state of the apparatus;

sensors for detecting fluid pressure in the tires; and a controller for the valves and the compressor for regulating the pressure in the tires to match tire pressure to operating conditions of the vehicle including vehicle speed, vehicle loading, road conditions and terrain.

The method of operating the apparatus comprises the steps of:

(a) detecting a fluid pressure in each of a plurality of tires of the motor vehicle;

(b) in response to the detected fluid pressure and to match tire pressure to operating conditions of the vehicle including vehicle speed, vehicle loading, road conditions and terrain, controlling the valves and a compressor directly connected to a pressure reservoir without the intermediary of a valve, the compressor, the pressure reservoir and the tires forming a closed system isolated from the atmosphere in a normal operating state of the apparatus; and (c) automatically compensating leakage losses of fluid from the closed system by admitting fluid thereto under pressure from a replaceable cartridge containing the fluid under pressure and connected to the closed system.

In the closed system according to the invention the tire-filling efficiency can be significantly increased with a constant compressor power, since the compressor power need only serve to shift a quantity of the fluid, usually gas, between two closed reservoirs at difference pressure levels and thus the enthalpy of the gas discharged from the tires is retained in the system and need not be supplied anew by the compressor. As a consequence no control is required between the compressor and the pressure reservoir by a switching element or the like.

The closed system by means of which a gas volume is shifted between the tires and the supply reservoir and in which the compressor serves to transfer a quantity of gas between two pressurized parts of the system, has numerous advantages by comparison with the open system in which during the filling of the tires fresh air is drawn from the atmosphere and upon pressure reduction, tire pressure is vented back to the atmosphere.

For example, because of the closed system, the gas which is used to pressurize the tires can be selected at will and other gases than air can be used. Various tire-inflating gases may have advantages over air and can improve the comfort of the ride.

Because of the closed system, moreover, air dryer as may have been required in earlier systems can be eliminated together with their cost and their spatial requirements.

The valving of the system can also be substantially simplified since the closed system does not require valve combinations to close off the system toward the exterior. Furthermore, the noisy venting of the system to the atmosphere which has been required can be eliminated thereby increasing the overall comfort level of the system.

The closed system does however have the disadvantage that it may be necessary to compensate for leakage. Because of the numerous connections, valves and seals in the pneumatic system, slight leakage is unavoidable. The closed system of the invention cannot compensate such leakage by drawing in fresh air from the ambient atmosphere. Thus according to the invention, leakage losses are compensated automatically bleeding gas from a replaceable cartridge which can be, for example, filled with liquified tire-inflating gas and automatically can refill the closed system to a setpoint value when the degree of filling of the closed system falls below a threshold.

According to a feature of the invention, in case of an emergency such as the failure of the closed system to be capable of compensating for a severe pressure loss in, for example, a defective tire, the system can be switched over to a fresh air supply. The same can be used when, for example, the pressure supply cartridge has been emptied and has not been replaced in a timely manner. For this purpose a valve capable of being switched over the connecting closed system of the atmosphere can be used. The fresh air supply valve can, in addition, be switched over according to the invention so as to be capable of venting the system and the various lines and pipe thereof or for filling the system initially the atmospheric air may be desirable for that purpose. The venting of the system can be effected in connection with the coupling of the system to the wheels or tires through a rotary distributing device.

The venting of the system of lines used in the apparatus of the invention can also be effected in response to other conditions, for example, the growth of the air volume in the system or in association with filling or pressure-reducing operations. For example, in a filling or pressure-reducing operation, the tires may be filled by another energy application and it may be desirable to compress the volume in the system to a minimum volume before control is reestablished in accordance with the invention. In those cases also venting may be desired. In normal operation, however, the system will be closed from the atmosphere and the latter valve will simply be closed off. The drive for varying the volume in the system is preferably an electrical drive.

BRIEF DESCRIPTION OF THE DRAWING

The sole FIGURE is a diagram of the system of the invention in which solid lines represent pneumatic lines and broken lines represent electrical lines for the transmission of control signals and sensor signals to a central processor unit and electrical controller for the pneumatic operation.

SPECIFIC DESCRIPTION

Figure 1:
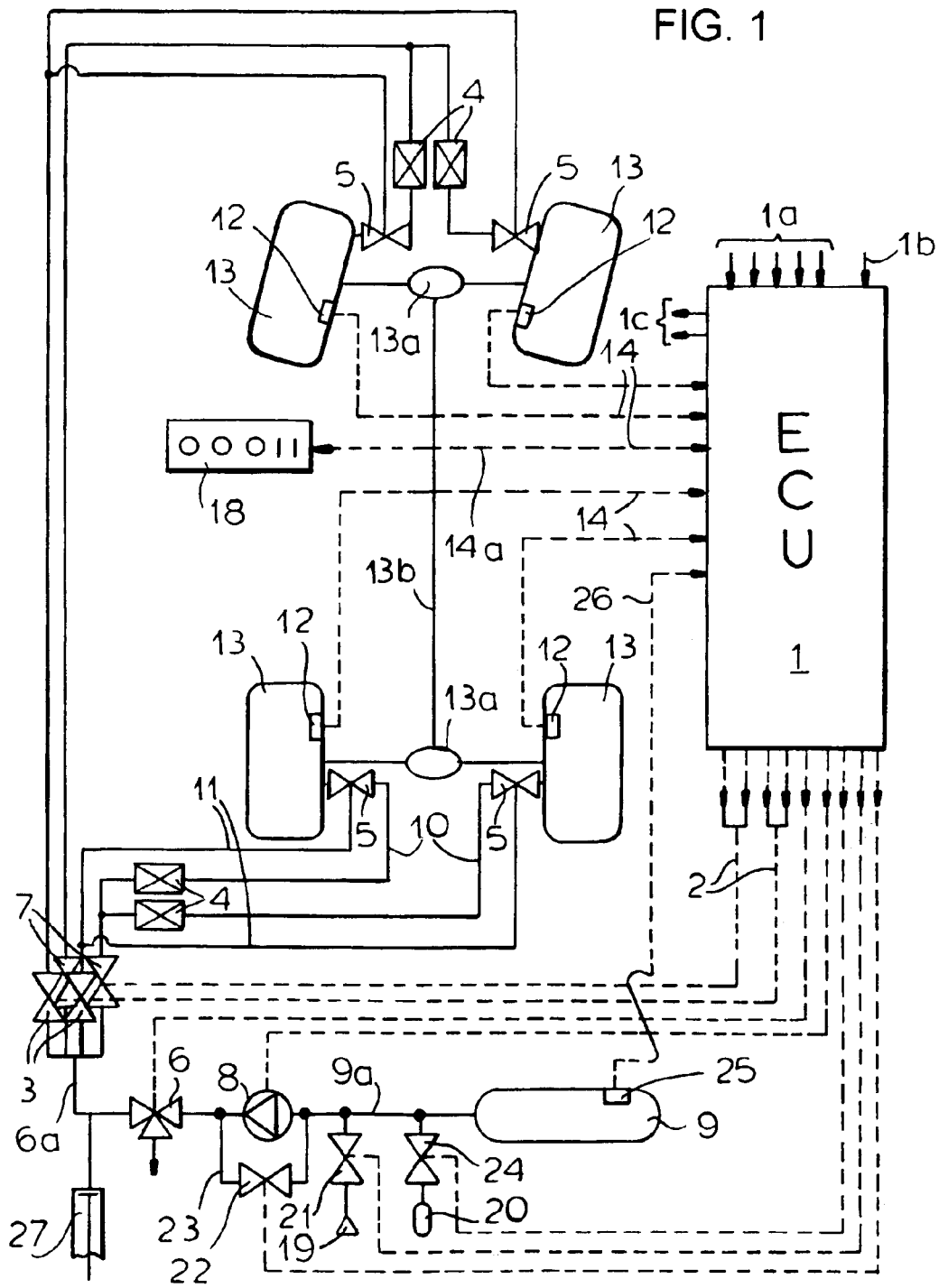

The sole FIGURE of the drawing shows an electronic control unit 1 into which may be incorporated a CPU and a memory, i.e. a computer, in which pressure information for the tire pressure control system can be programmed along with data as to the response of that tire pressure system to the different operating conditions of the vehicle such as the vehicle speed, the vehicle load, rod conditions, terrain and the like. Such information may be provided by the inputs represented at 1a. A programming input can be provided at 1b and one or more outputs 1c can be provided to display or other outputting peripheral as may be desired to program and monitor the program in the CPU.

While sensors are shown here to respond to the tire pressure, other tire conditions can also be monitored.

The drawing furthermore, shows a pneumatic switching system for controlling tire pressure at each of the tires for a two-axle vehicle and thus for axle-wise control of the wheel. All four wheels may have independent control or a single control may be provided in all four wheels or for any combination of pairs, individual or axle control of one, two or more axles and two, four or more wheels as desired.

The electronic control unit 1 is connected to the sensors through a logic system which may be built into the electronic control unit and may be in addition to the central processing unit and which assists in matching the response to the electronic control unit to the operating state of the vehicle and the tire pressure. Inputs as represented at 1a may thus represent such vehicle conditions as the speed, as already noted, braking effect, the load on the vehicle as monitored at the suspension, for example, the pitch of the vehicle in hill climbing or hill descent or the like. A preferred vehicle speed and vehicle condition monitoring system is described in detail in Austrian patent 408,867 B and in Austrian patent application A 1274/2001. The tire pressure monitoring is state of the art.

In the drawing, the electrical control unit (ECU) 1 receives sensor inputs from lines 14, 14a and 26 and has output lines 2 to the effectors.

The system comprises a compressor 8 controlled by one of these lines 2 and connected between a pressure reservoir 9 and a group of valves 7 which supply the sealing packets 4 upstream of tire valves 5, each connected to a respective tire 13 by a rotary fluid supply head. The tires 13 of the cylinders can be driven through differentials 13a from a vehicle drive-shaft 13b.

Between the compressor and the valves 7 is a three-way valve 6 which also feeds another group of valves 3, referred to as control valves as distinct from the filling valve 7 which operates the pilots for the valves 5. The lines between the sealing packets 4 and the valves 5 have been shown at 10 while the lines between the control valve 3 and the pilots for the valves 5 have been shown at 11. The tire pressure sensors are connected to the ECU 1 by lines 14.

The system also includes an electromechanically-controlled valve 24 connected between a replaceable cartridge 20 containing a tire-filling fluid under pressure and the line 9a between the compressor 8 and the pressure reservoir. A sound damper 19 opens into the atmosphere at the discharge side of a valve 21 connected to the line 9a. A bypass valve 22 is connected in a bypass 23 across the compressor 8 and a venting system 27 can also be provided in the line 6a between the three-way valve 6 and the valve sets 3 and 7. The valves 21, 22, 24 and 6 are all controlled by lines 2 from the ECU 1 as are the valves 3 and 4.

If, as a result of the logic analysis or the computer analysis in the electronic control unit, the unit 1 requires the control response of the system, the electronic control unit 1 operates as follows:

A switching command will be generated if a measured value which is monitored from one of the sensors 12 of a tire 13 or at 1a differs substantially from a range for that measurement in the memory of the computer or in the preset field. If a pressure increase in one or more of the tires is required, the control lines 2 of the respective electromagnetic control valves 3 will be energized and the valves opened. Compressed gas will flow via the control gas lines 11 to the pilots which maintain the tire valves 5 sealed until the control gas causes the pilots to open the tire valve. The tire valves 5 are then opened and the tires 13 pressurized. Simultaneously the three-way valve 6 is actuated and the filling valves 7 for the respective tires or control circuits are opened and pressure from the compressor or the elevated pressure in the pressure reservoir 9 can be applied to the tire. A pressure sensor 25 and a data lien 26 transmit an indication of the pressure in the reservoir 9 to the electronic control unit. A bypass 23, whose valve 22 is operated by the electronic control unit 1 can bypass 8 when the reservoir pressure at 9 is sufficient. The pressure from the reservoir 9 will then flow through the lines 10 and the sealing packets 4 of the tire valves 5 and increase the pressure in the respective tires 13. The sealing packets 4 distribute the filling gas to the rotatable parts of the system.

The three-way valve 6 in this arrangement has a branch to enable the tire-filling system, namely, the compressor 8 and the pressure reservoir 9 to be used for other purposes as well, for example, to pressurize the suspension in the case that the suspension includes gas-pressurizable springs.

Since the volume of the tires is very large by comparison to the internal volume of the filling lines 10 and the pressure change in the tires occurs relatively slowly, the tire internal pressure can be seen from a measurement point of view as quasistatic and only from the measurement of the static pressure component of the gas can a substantially precise value be obtained of the tire pressure. The pressure sensor 12 of each tire may thus include a wheel electronic system with a pressure sensor for measuring the pressure in the tire continuously and supplying that measurement via the electric line 14 to the electronic control unit 1.

The filling process is interrupted when a setpoint pressure is reached, at which point the control valve 3, the filling valve 7 and the three-way valve 6 are all closed and the pneumatically actuated wheel valve 5 simultaneously shuts down. All of the pneumatic lines 10, 11 can then be vented through the valve 21 and the sound damper 19 or through a separate venting system 27 to the exterior to discharge the excess volume. The venting is controlled by the ECU 1.

When a command is generated by the ECU 1 as result of a comparison of the measured values with the data base or information stored which requires a reduction in the pressure in the tire, the gas flow is in the opposite direction and the compressor can drive the gas from the tires 13 via the wheel valves 5, the filling lines 10, the filling valves 7, the valve 6 and line 9a back into the pressure reservoir 9. The shutoff command is produced by a corresponding signal at the ECU 1 when the sensors 12 indicate that the pressure reduction setpoint has been reached.

A display is provided at 18 so that the driver can see the current state of each of the tires and using this display the driver can readily note a defective tire or can be alerted to it by a warning signal which is produced by the ECU 1. The driver can also be signaled as to the maximum speed which the vehicle should sustain under the particular tire inflation conditions.

Leakage losses are replaced from the easily replaceable cartridge 20 which is filled with the same medium as the closed system, for example, air or a special tire gas. The system can be refilled simply by opening the valve 24 until the pressures in the cartridge 20 and in the closed system equalize.

Should there be a drastic pressure loss, e.g. because of a defective tire, the valve 21 can be opened and compressor 8 operated to permit a fresh air supply. The same holds true should the cartridge 20 be emptied and not replaced in a timely manner. Note that there is no valve in the line 9a between the compressor 8 and the pressure storage reservoir 9.

We claim:

1. An automatic tire-filling apparatus for a motor vehicle, comprising:
   a pressure reservoir for a tire-filling fluid;
   a compressor directly connected to said pressure reservoir without the intermediary of a valve;
   a multiplicity of valves connected to said compressor and arranged to control pressure in tires of said vehicle, said compressor, said pressure reservoir and the tires forming a closed system isolated from the atmosphere in a normal operating state of the apparatus;
   sensors for detecting fluid pressure in said tires; and
   a controller for said valves and said compressor for regulating the pressure in said tires to match tire pressure to operating conditions of said vehicle including vehicle speed, vehicle loading, road conditions and terrain.

2. An automatic tire-filling apparatus for a motor vehicle, comprising:
   a pressure reservoir for a tire-filling fluid;
   a compressor directly connected to said pressure reservoir without the intermediary of a valve;
   a multiplicity of valves connected to said compressor and arranged to control pressure in tires of said vehicle, said compressor, said pressure reservoir and the tires forming a closed system isolated from the atmosphere in a normal operating state of the apparatus;
   sensors for detecting fluid pressure in said tires; and
   a controller for said valves and said compressor for regulating the pressure in said tires to match tire pressure to operating conditions of said vehicle including vehicle speed, vehicle loading, road conditions and terrain, and
   a replaceable cartridge containing at a tire-filling gas under pressure and a valve operated by said controller and connecting said cartridge to said system for automatically restoring a degree of filling of said closed system with said gas to a setpoint.

3. The apparatus defined in claim 2, further comprising a valve operated by said controller for connecting said closed system to the ambient atmosphere for a fresh air supply to said closed system.

4. The apparatus defined in claim 3, further comprising a three-way valve between said compressor and said multiplicity of valves and operated by said controller, said three-way valve having a branch enabling a supply of pressurized gas to another system.

5. The apparatus defined in claim 3, further comprising a vent operated by said controller for venting a volume of fluid from said closed system corresponding substantially to a volume of fluid lines in said closed system and corresponding to a variable additional volume for said closed system.

6. The apparatus defined in claim 1, further comprising a valve operated by said controller for connecting said closed system to the ambient atmosphere for a fresh air supply to said closed system.

7. The apparatus defined in claim 1, further comprising a three-way valve between said compressor and said multiplicity of valves and operated by said controller, said three-way valve having a branch enabling a supply of pressurized gas to another system.

8. The apparatus defined in claim 1, further comprising a vent operated by said controller for venting a volume of fluid from said closed system corresponding substantially to a volume of fluid lines in said closed system and corresponding to a variable additional volume for said closed system.

9. A method of operating an apparatus for the automatic filling of tires of a motor vehicle, said method comprising the steps of:

(a) detecting a fluid pressure in each of a plurality of tires of the motor vehicle;

(b) in response to the detected fluid pressure and to match tire pressure to operating conditions of said vehicle including vehicle speed, vehicle loading, road conditions and terrain, controlling said valves and a compressor directly connected to a pressure reservoir without the intermediary of a valve, said compressor, said pressure reservoir and the tires forming a closed system isolated from the atmosphere in a normal operating state of the apparatus; and (c) automatically compensating leakage losses of fluid from said closed system by admitting fluid thereto under pressure from a replaceable cartridge containing the fluid under pressure and connected to said closed system.

* * * * *